United States Patent
Nagaoka et al.

(10) Patent No.: US 10,837,336 B2
(45) Date of Patent: Nov. 17, 2020

(54) EXHAUST GAS PURIFYING SYSTEM

(71) Applicant: ISUZU MOTORS LIMITED, Tokyo (JP)

(72) Inventors: Daiji Nagaoka, Kamakura (JP); Takayuki Sakamoto, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 56 days.

(21) Appl. No.: 16/300,321

(22) PCT Filed: May 11, 2017

(86) PCT No.: PCT/JP2017/017789
§ 371 (c)(1),
(2) Date: Nov. 9, 2018

(87) PCT Pub. No.: WO2017/195856
PCT Pub. Date: Nov. 16, 2017

(65) Prior Publication Data
US 2019/0153922 A1 May 23, 2019

(30) Foreign Application Priority Data

May 11, 2016 (JP) ................................ 2016-095144

(51) Int. Cl.
*F01N 3/20* (2006.01)
*F01N 3/36* (2006.01)
(Continued)

(52) U.S. Cl.
CPC ................. *F01N 3/20* (2013.01); *F01N 3/08* (2013.01); *F01N 3/36* (2013.01); *F02D 41/025* (2013.01);
(Continued)

(58) Field of Classification Search
CPC combination set(s) only.
See application file for complete search history.

(56) References Cited

U.S. PATENT DOCUMENTS 6,237,329 B1 * 5/2001 Mizuno ................. F01N 3/0842
60/285
7,899,605 B2 3/2011 Kojima
(Continued)

FOREIGN PATENT DOCUMENTS

EP 1503065 A2 2/2005
GB 2471007 A 12/2010
(Continued)

OTHER PUBLICATIONS

International Search Report and Written Opinion for related International Application No. PCT/JP2017/017789, dated Jul. 18, 2017; English translation of ISR provided; 8 pages.
(Continued)

*Primary Examiner* — Binh Q Tran
(74) *Attorney, Agent, or Firm* — Procopio, Cory, Hargreaves & Savitch LLP

(57) ABSTRACT

A control apparatus (12): creates a torque correction table indicating a relationship between a change rate of an intake air amount, a change of the main injection amount and the main injection timing of a fuel injection apparatus (8) in the torque value of a diesel engine (1) in a lean state; measures an intake air amount in a rich state by using an MAF sensor (11); calculates a change rate of the measured intake air amount for the intake air amount in the lean state; obtains a correction value of the main injection amount and a correction value of the main injection timing of the fuel injection apparatus (8) based on the calculated change rate and the torque correction table; and performs an injection of the fuel in the rich state at the main injection amount and the main
(Continued)

injection timing, corrected by the respective correction values.

1 Claim, 5 Drawing Sheets

(51) Int. Cl.
*F02D 41/04* (2006.01)
*F01N 3/08* (2006.01)
*F02D 41/40* (2006.01)
*F02D 41/18* (2006.01)
*F02D 41/02* (2006.01)
*F02D 41/24* (2006.01)

(52) U.S. Cl.
CPC ......... *F02D 41/0275* (2013.01); *F02D 41/04* (2013.01); *F02D 41/182* (2013.01); *F02D 41/2422* (2013.01); *F02D 41/40* (2013.01); *F02D 41/401* (2013.01); *F01N 2900/08* (2013.01); *F01N 2900/1411* (2013.01); *F01N 2900/1614* (2013.01)

(56) References Cited

U.S. PATENT DOCUMENTS

| | | | | |
|---|---|---|---|---|
| 8,001,767 B2* | 8/2011 | Kakuya | ............... | F02D 13/0246 60/276 |
| 8,033,097 B2* | 10/2011 | Wada | ................... | F01N 3/0814 60/274 |
| 2002/0189580 A1 | 12/2002 | Surnilla et al. | | |
| 2005/0188948 A1* | 9/2005 | Miura | ................. | F02D 41/0002 123/299 |
| 2006/0005532 A1* | 1/2006 | Kitahara | ............... | F02D 41/027 60/285 |
| 2006/0011180 A1* | 1/2006 | Sasaki | ................... | F01N 3/0814 123/698 |
| 2008/0202098 A1 | 8/2008 | Fisher et al. | | |
| 2011/0202256 A1* | 8/2011 | Sauve | ................. | F02D 41/0025 701/104 |
| 2018/0094596 A1 | 4/2018 | Nishito et al. | | |

FOREIGN PATENT DOCUMENTS

| | | |
|---|---|---|
| JP | H07-279718 A | 10/1995 |
| JP | 2003-322015 A | 11/2003 |
| JP | 2006-274904 A | 10/2006 |
| JP | 2006-299952 A | 11/2006 |
| JP | 2016-061145 A | 4/2016 |
| WO | 2009-130801 A1 | 10/2009 |

OTHER PUBLICATIONS

Extended European Search Report for related EP App No. 17796214.9 dated Mar. 26, 2016, 6 pgs.

* cited by examiner

FIG.3

| CHANGE RATE OF MEASURED INTAKE AIR AMOUNT [%] | CHANGE AMOUNT OF MAIN INJECTION AMOUNT [mm³/st] | CHANGE AMOUNT OF MAIN INJECTION TIMING [deg] |
|---|---|---|
| -20 | 3 | 4 |
| -15 | 3 | 4 |
| -10 | 2 | 3 |
| -5 | 1 | 2 |
| 0 | 0 | 0 |
| 5 | -1 | 2 |
| 10 | -2 | 3 |
| 15 | -3 | 4 |
| 20 | -3 | 4 |

FIG.4

| ENGINE TORQUE [km] | ROTATIONAL SPEED OF ENGINE [rpm] | | | | |
|---|---|---|---|---|---|
| | 500 | 1000 | 1500 | 2000 | 2500 |
| 50 | | | | | |
| 100 | | | | | |
| 150 | | | | | |
| 200 | | · INTAKE AIR AMOUNT | | | |
| 250 | | · MAIN INJECTION AMOUNT | | | |
| 300 | | · MAIN INJECTION TIMING | | | |
| 350 | | | | | |
| 400 | | | | | |

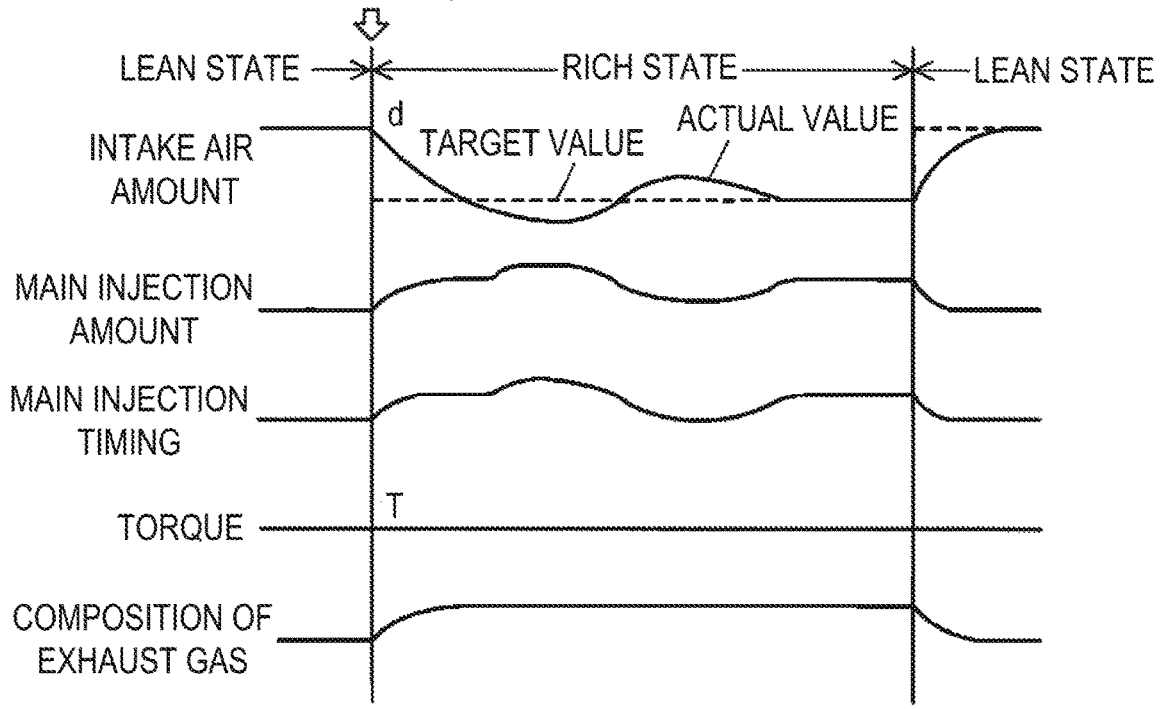
FIG.6 PRESENT EXAMPLE
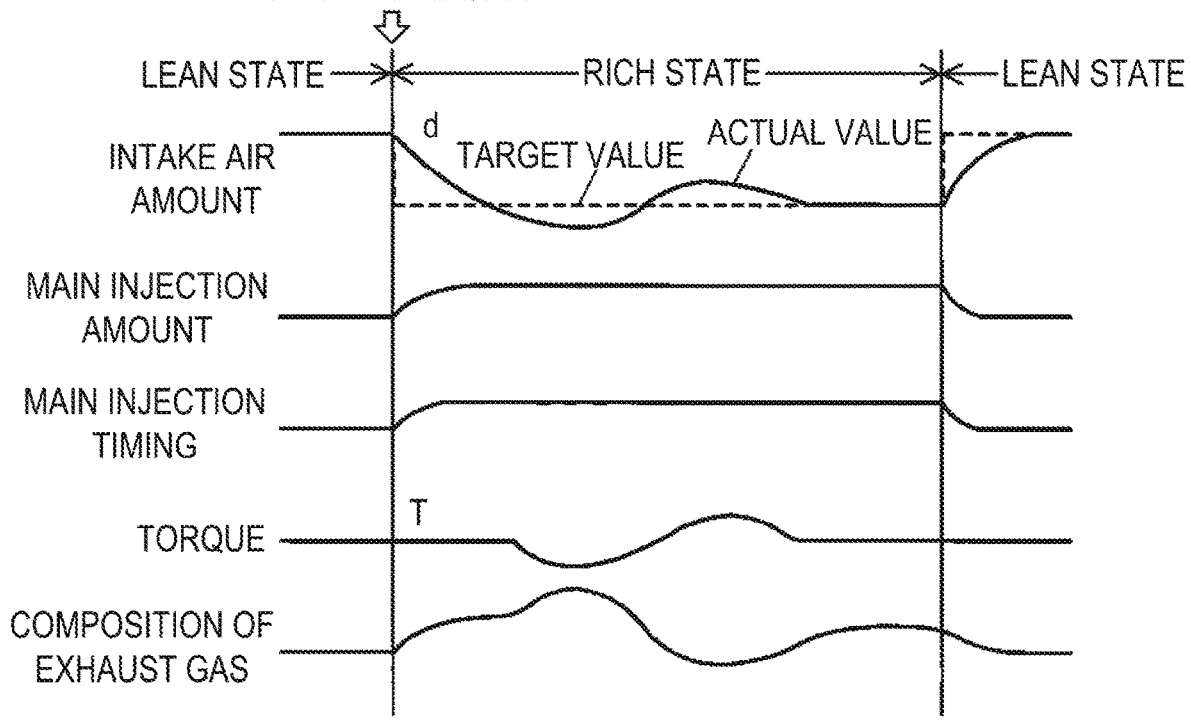
FIG.7 BACKGROUND EXAMPLE

EXHAUST GAS PURIFYING SYSTEM

TECHNICAL FIELD

The present disclosure relates to an exhaust gas purifying system, and more specifically, to an exhaust gas purifying system that suppresses a variation in engine torque and the like at the time of rich reduction in the exhaust gas purifying system using a $NO_x$ storage-reduction catalyst.

BACKGROUND ART

In diesel engines, an exhaust gas purifying system that removes harmful substances such as particulate matter (PM) and nitrogen oxide ($NO_x$) contained in exhaust gas is required. Regarding the latter NOR, attention has been drawn to a $NO_x$ storage-reduction catalyst. The exhaust gas purifying system using the $NO_x$ storage-reduction catalyst desorbs the stored $NO_x$ and reduces the $NO_x$ by a three-way function to purify the exhaust gas by temporarily storing $NO_x$ in a $NO_x$ storage substance when an air-fuel ratio of the exhaust gas is in a lean state and switching the exhaust gas to a rich state.

When switching from the lean state to the rich state, it is known that a variation of engine torque, composition deterioration of exhaust gas, and a change in combustion noise occur due to response delays between an intake system and a fuel system (see, for example, Patent Literature 1). For this reason, in a background art, control is performed such that an intake air amount and a fuel injection amount are determined and switched for a target excess air ratio (target)) and a final target λ, respectively. At this time, the injection amount and the injection timing of fuel are continuously changed according to the intake air amount between the lean state and the rich state.

CITATION LIST

Patent Literature

[Patent Literature 1]: JP-A-2006-299952

SUMMARY

Technical Problem

However, since the above-described control is intended only at the time of switching, it is difficult to suppress variation in engine torque or the like caused by the variation of the intake air amount in the rich state (at the time of rich reduction).

The exhaust gas purifying system using the $NO_x$ storage-reduction catalyst of the present disclosure suppresses a variation in engine torque, composition deterioration of exhaust gas, and a change in combustion noise at the time of rich reduction.

Solution to Problem

The exhaust gas purifying system of the present disclosure includes a $NO_x$ storage-reduction catalyst that stores $NO_x$ when exhaust gas flowing through an exhaust passage of an engine is in a lean state and reduces the stored $NO_x$ when the exhaust gas is in a rich state, a fuel injection apparatus that injects fuel to a cylinder of the engine, an MAF sensor that is installed in an intake passage of the engine, and a control apparatus, wherein in response to a request of a rich spike, the control apparatus switches the exhaust gas from the lean state to the rich state, creates a torque correction table indicating a relationship between a change rate of an intake air amount, a change amount of a main injection amount of the fuel injection apparatus, and a change amount of a main injection timing in a torque value of the engine in the lean state, measures an intake air amount in the rich state by using the MAF sensor, calculates a change rate of the measured intake air amount with respect to an intake air amount in the lean state, obtains a correction value of the main injection amount and a correction value of the main injection timing of the fuel injection apparatus, respectively, based on the calculated change rate and the torque correction table, and controls to perform an injection of the fuel in the rich state at the main injection amount and the main injection timing that are corrected by the respective correction values.

Advantageous Effects of the Invention

According to the exhaust gas purifying system of the present disclosure, since a main injection amount and a main injection timing of fuel are respectively corrected so that the torque of a diesel engine is maintained at a torque value in a lean state according to a variation of an intake air amount in a rich state, it is possible to suppress a variation in engine torque, composition deterioration of exhaust gas, and a change in combustion noise at the time of rich reduction.

BRIEF DESCRIPTION OF THE DRAWINGS

FIG. 3 is an example of a torque correction table.

FIG. 4 is an example of a torque map.

FIG. 6 is a graph showing changes in main parameters in the present example.

FIG. 7 is a graph showing changes in main parameters in an example of the related art.

DETAILED DESCRIPTION

Figure 1:
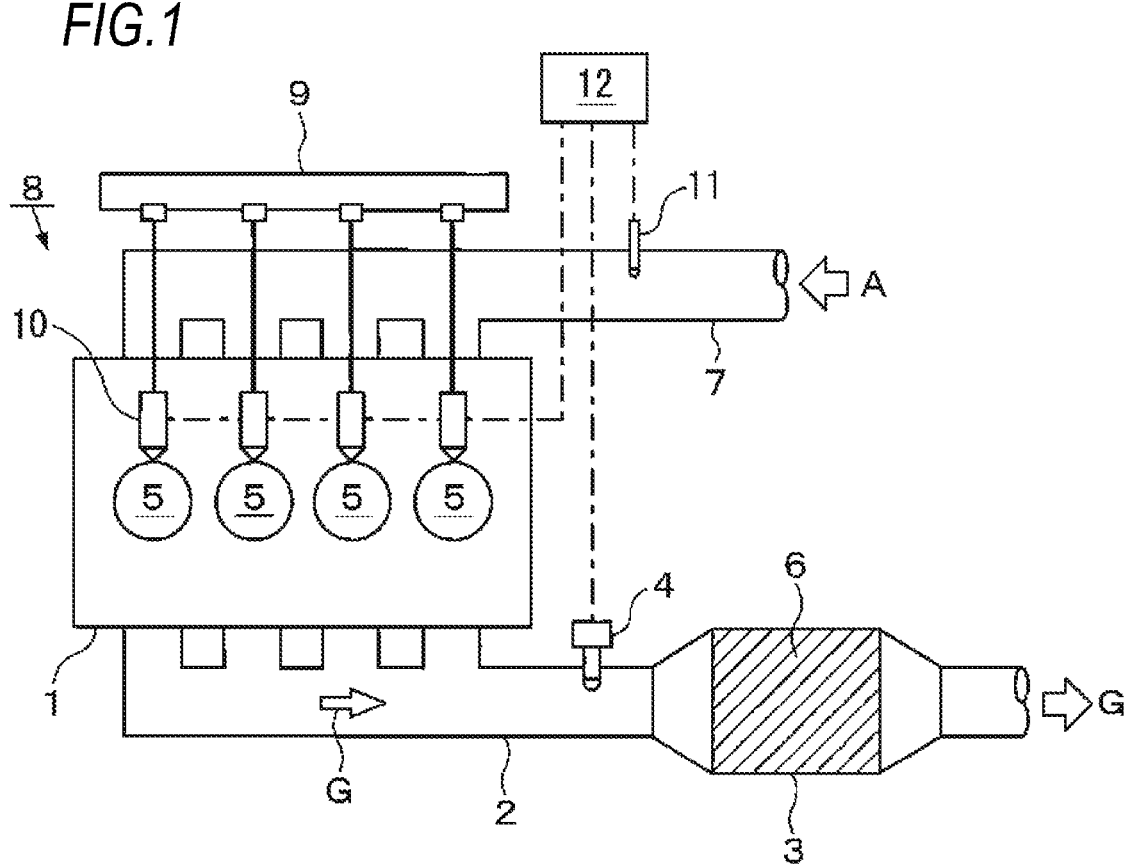
FIG. 1 is a configuration diagram of an exhaust gas purifying system according to an embodiment of the present disclosure.

Hereinafter, embodiments of the present disclosure will be described with reference to drawings. FIG. 1 shows an exhaust gas purifying system according to an embodiment of the present disclosure.

This exhaust gas purifying system includes a large-diameter catalytic converter 3 interposed in an exhaust passage 2 of a diesel engine 1 and an injection nozzle 4 which is a fuel adding unit installed in the exhaust passage 2 on the upstream side of the catalytic converter 4. As the fuel adding unit, post injection in fuel injection into cylinders 5 of the diesel engine 1 may be used instead of the injection nozzle 4.

In the catalytic converter 3, a $NO_x$ storage-reduction catalyst 6 (hereinafter, referred to as "Lean $NO_x$ Trap (LNT) catalyst") is stored. The LNT catalyst 6 is formed by supporting a catalytic metal and a $NO_x$ storage substance on the surface of a carrier of a monolithic honeycomb cell formed of γ alumina or the like. Pt or Pd is used as the catalytic metal. As the $NO_x$ storage substance, any one or a combination of alkaline metals such as K, Na, Li, Cs, or the like, alkaline earth metals such as Ba and Ca, or the like is used.

In the diesel engine 1, air A supplied through the intake passage 7 mixes and combusts with the fuel injected into the cylinder 5 through a common rail 9 which is a fuel injection apparatus 8 and an injector 10, and then becomes exhaust gas G and is exhausted to the exhaust passage 2, and flows into the LNT catalyst 6 in the catalytic converter 3. A Mass Flow Sensor (MAF) sensor 11 that measures an intake air amount is installed in the intake passage 7.

The injection nozzle 4, the fuel injection apparatus 8, and the MAF sensor 11 are connected to a control apparatus 12 through a signal line (indicated by a one-dot chain line).

Figure 2:
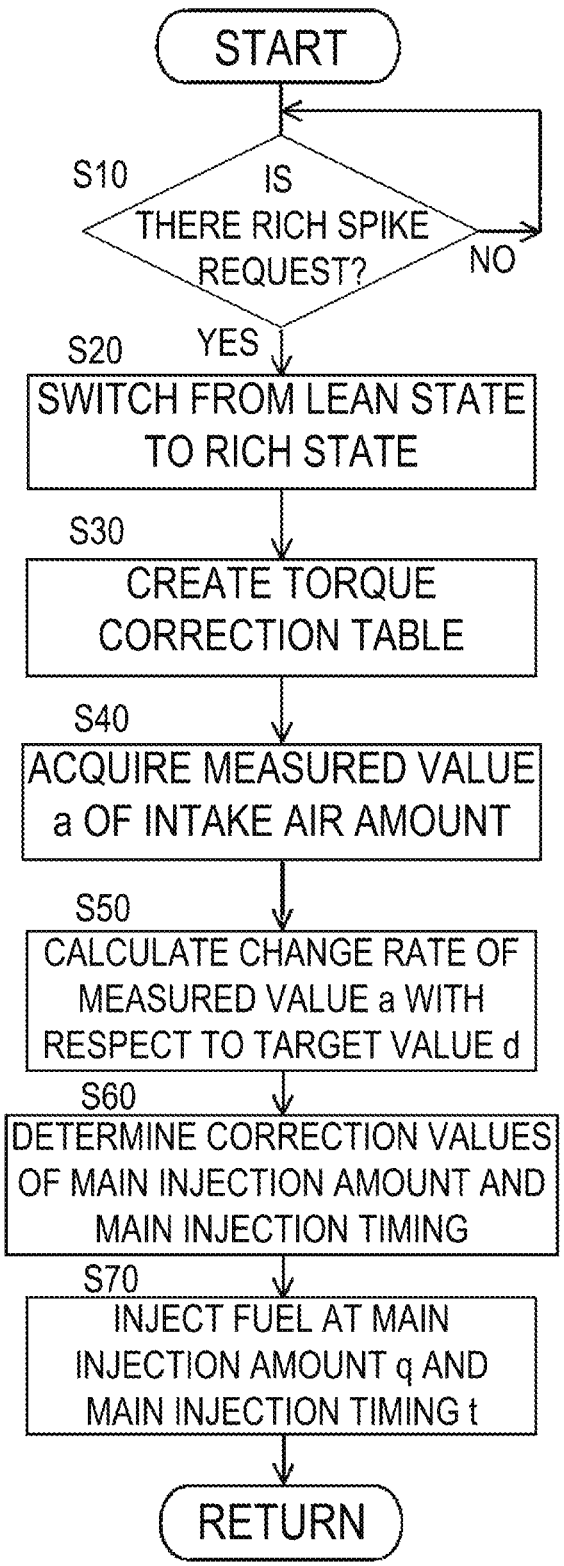
FIG. 2 is a flowchart for describing functions of a control apparatus.

The function of the control apparatus 12 in such an exhaust gas purifying system will be described below with reference to FIG. 2.

The control apparatus 12 confirms the presence or absence of a rich spike request (S10) and when the request is made, switches exhaust gas G flowing into the LNT catalyst 6 from a lean state to a rich state (S20). When switching from the lean state to the rich state, a match of the actual intake air amount to a target intake air amount due to the adjustment of the opening degree of an intake throttle or an EGR valve (not shown), the addition of the main injection amount of fuel, the advance of the main injection timing, and the addition of fuel by the injection nozzle 4 are executed. Here, "main injection" refers to the injection of fuel to be burned in the cylinders 5.

Next, the control apparatus 12 creates a torque correction table showing a relationship between the change rate of the intake air amount, the change amount of the main injection amount, and the change amount of the main injection timing of fuel in the fuel injection apparatus 8 at a target torque value T of the diesel engine 1 (S30). As the target torque value T, the torque value in the lean state, immediately before switching to the rich state, is selected.

FIG. 3 shows an example of the torque correction table. In this example, when the change rate of the intake air amount is positive, the main injection amount is decreased to advance the main injection timing. On the other hand, when the change rate of the intake air amount becomes negative, the main injection timing is increased to advance the main injection timing. As illustrated in FIG. 4, this torque correction table shows a relationship between the rotational speed and torque of the diesel engine 1 operating under a certain condition in the rich state, the intake air amount, and the main injection amount and the main injection timing, respectively and may be created based on a torque map set in advance by experiment or the like.

Next, the control apparatus 12 acquires a measured value a of the intake air amount in the rich state using the MAF sensor 11 (S40) and calculates a change rate of the measured value a with respect to a target intake air amount d in the lean state (S50). As the target intake air amount d, the intake air amount, immediately before switching to the rich state, is selected.

Next, the control apparatus 12 obtains a correction amount of the main injection amount and a correction amount of the main injection timing based on the calculated change rate and the torque correction table (S60).

Then, the control apparatus 12 performs injection of fuel at a main injection amount q and a main injection timing t corrected by these correction amounts by using the fuel injection apparatus 8 (S70).

The control apparatus 12 repeats the above steps 40 to 70 during the rich state.

In this way, since a main injection amount and a main injection timing of fuel are respectively corrected so that the torque of the diesel engine 1 is maintained at a torque value T in a lean state according to a variation of an intake air amount in a rich state, it is possible to suppress a variation in engine torque, composition deterioration of the exhaust gas G, and a change in combustion noise at the time of rich reduction.

Figure 5:
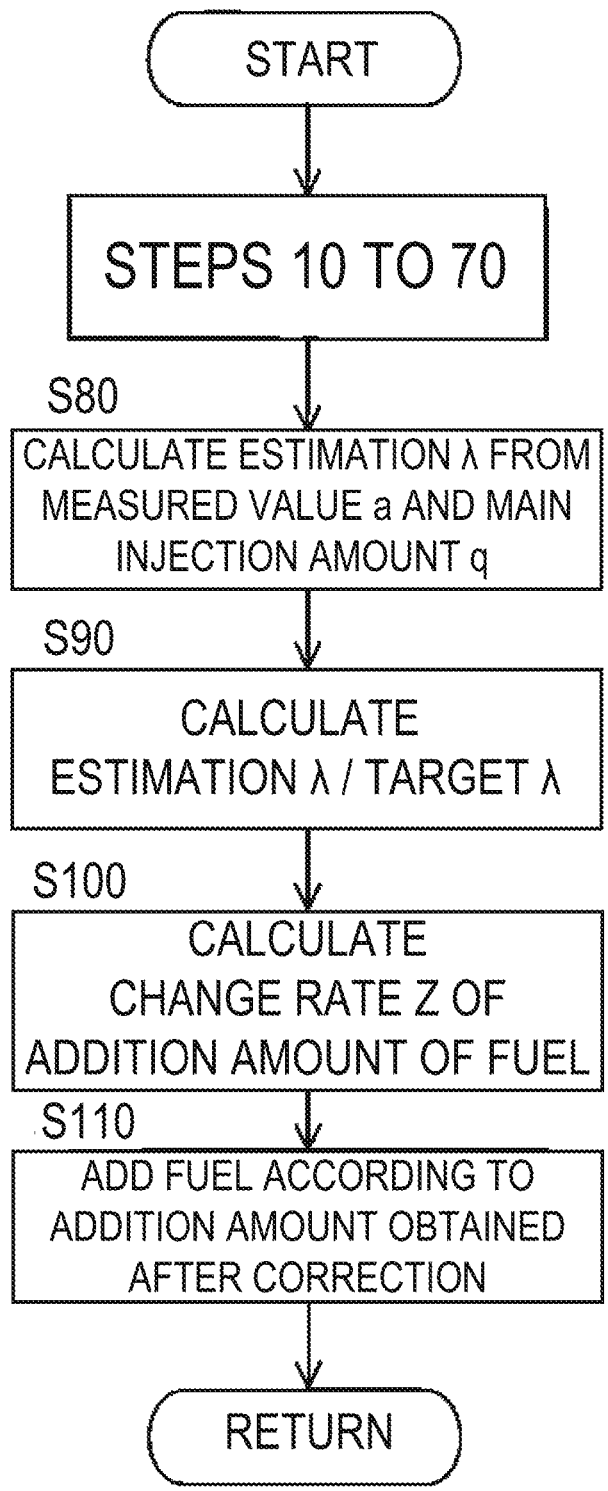
FIG. 5 is a flowchart for describing another example of functions of the control apparatus.

Another example of the functions of the control apparatus 12 in the exhaust gas purifying system will be described below with reference to FIG. 5. Steps 10 to 70 have the same processing contents as those in FIG. 2, so the details are omitted.

Subsequent to step 70, the control apparatus 12 calculates an estimation value (estimation 2) of the excess air ratio in the rich state from the measured value a acquired in step 40 and the main injection amount q corrected in step 70 using the following equation (1) (S80).

$$\text{Estimation } \lambda = a/q \div X \quad (1)$$

X represents a theoretical air-fuel ratio, for example, a value of 14.5 is used.

Next, the control apparatus 12 calculates a ratio R (=estimation λ/target λ) of the estimation λ with respect to a preset target excess air ratio (target λ) (S90).

Next, the control apparatus 12 calculates a change rate Z of the addition amount of fuel by the injection nozzle 4 required to set the estimation λ to the target λ based on the calculated ratio R and a preset supply ratio Y of fuel between the fuel injection apparatus 8 and the injection nozzle 4 using the following equation (2) (S100). This supply ratio Y of fuel is a ratio of an addition of the main injection amount of fuel when switching from the lean state to the rich state and the addition amount of the fuel by the injection nozzle 4 and is determined in advance by experiment or the like.

$$Z = Y/R \quad (2)$$

Then, the control apparatus 12 adds fuel by the addition amount corrected by the change rate Z using the injection nozzle 4 (S110). For example, in a case where a=14.5, q=1.0, Y is 0.5:0.5, and the target λ=1, when the intake air amount decreases by 5%, since the estimation λ=0.95 and Z=1.05, the addition amount of fuel from the injection nozzle 4 is increased by 5%.

The control apparatus 12 repeatedly performs the above steps 40 to 110 during the rich state.

The above steps 80 to 110 may also be applied to post injection instead of the injection nozzle 4.

In this way, since the amount of fuel added to the exhaust passage 2 is corrected so that the excess air ratio of the exhaust gas G becomes equal to the preset target λ according to the variation of the intake air amount in the rich state, the combustion of the fuel in the cylinder 5 becomes favorable, and it is possible to improve the effect of suppressing the variation in engine torque, composition deterioration of exhaust gas, and changes in combustion noise.

The Present Example

For the exhaust gas purifying system shown in FIG. 1, when the present disclosure is implemented (the present example) and when the control method of the related art is implemented (example of the related art), changes of the main parameters according to the variation in the actual value of the intake air amount are shown in FIGS. 6 and 7, respectively.

From the comparison of FIGS. 6 and 7, in the present example, since the main injection amount and the main injection timing are corrected according to the variation of the actual value of the intake air amount, it is understood that variation in the torque of the diesel engine 1 and composition deterioration of the exhaust gas G are suppressed as compared with the example of the related art.

This application is based upon and claims the benefit of priority from Japanese Patent Application No. 2016-095144, filed on May 11, 2016, the entire contents of which are incorporated herein by reference.

INDUSTRIAL APPLICABILITY

According to the exhaust gas purifying system of the present disclosure, it is possible to suppress a variation in engine torque, composition deterioration of exhaust gas, and a change in combustion noise at the time of rich reduction.

REFERENCE SIGNS LIST

1: Diesel engine
2: Exhaust passage
3: Catalytic converter
4: Injection nozzle
5: Cylinder
6: LNT catalyst
7: Intake passage
8: Fuel injection apparatus
9: Common rail
10: Injector
11: MAF sensor
12: Control apparatus

The invention claimed is:

1. An exhaust gas purifying system comprising:
a NOx storage-reduction catalyst that stores NOx when exhaust gas flowing through an exhaust passage of an engine is in a lean state and reduces the stored NOx when the exhaust gas is in a rich state;
a fuel injection apparatus that injects fuel to a cylinder of the engine;
an MAF sensor that is installed in an intake passage of the engine;
a fuel adding unit that adds fuel to the exhaust passage; and
a control apparatus, wherein
in response to a request of a rich spike, the control apparatus is configured to:
switch the exhaust gas from the lean state to the rich state,
create a torque correction table indicating a relationship between a change rate of an intake air amount, a change of a main injection amount and a change of a main injection timing of the fuel injection apparatus in a torque value of the engine in the lean state,
measure an intake air amount in the rich state by using the MAF sensor,
calculate a change rate of the measured intake air amount with respect to the intake air amount in the lean state,
obtain a correction value of the main injection amount and a correction value of the main injection timing of the fuel injection apparatus, respectively, based on the calculated change rate and the torque correction table,
control to perform an injection of the fuel in the rich state at the main injection amount and the main, injection timing that are corrected by the respective correction values,
estimate an excess air ratio in the rich state from the measured intake air amount and the corrected main injection amount,
calculate a ratio of the estimated excess air rate with respect to a preset target excess air ratio,
calculate a change rate of an addition amount of the fuel by the fuel adding unit based on the calculated ratio of the excess air ratio, and
add the fuel in the rich state according to the addition amount that are corrected by the change rate.

* * * * *